Aug. 5, 1958   F. PAPKE   2,845,756
PROFILE PROJECTOR OR COMPARATOR FOR CUTTING MACHINE TOOLS
Filed Feb. 25, 1957   5 Sheets-Sheet 2
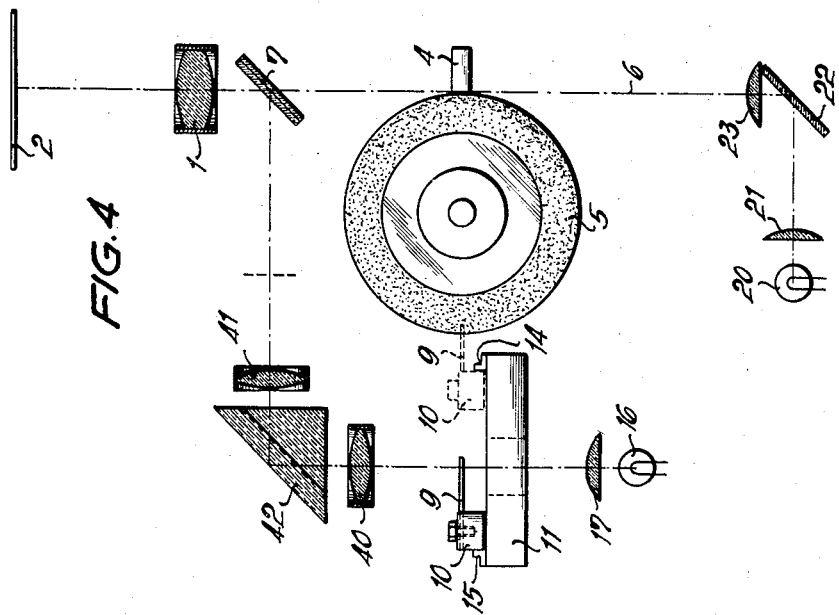
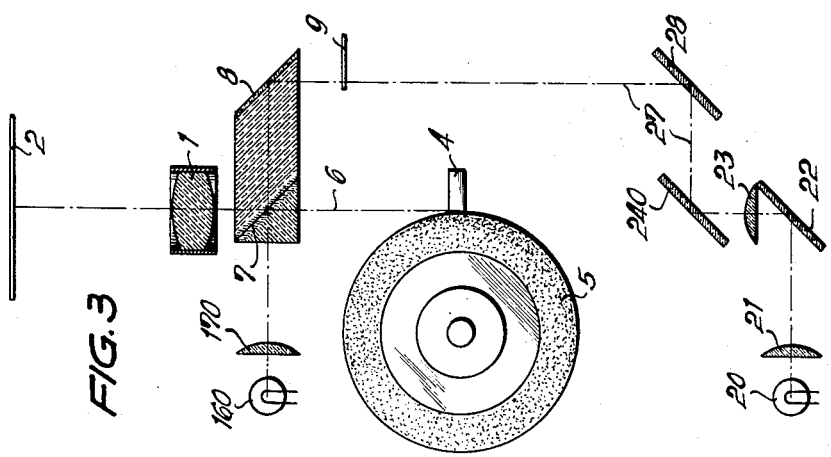

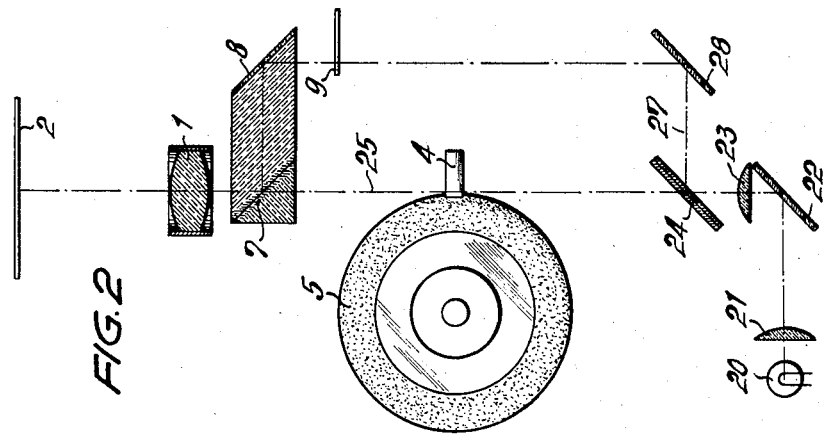
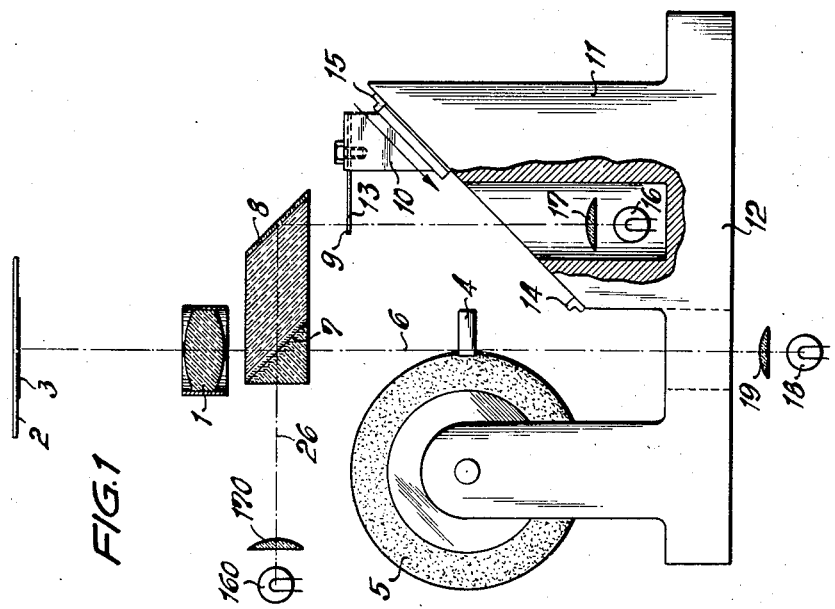

Aug. 5, 1958 F. PAPKE 2,845,756
PROFILE PROJECTOR OR COMPARATOR FOR CUTTING MACHINE TOOLS
Filed Feb. 25, 1957 5 Sheets-Sheet 3
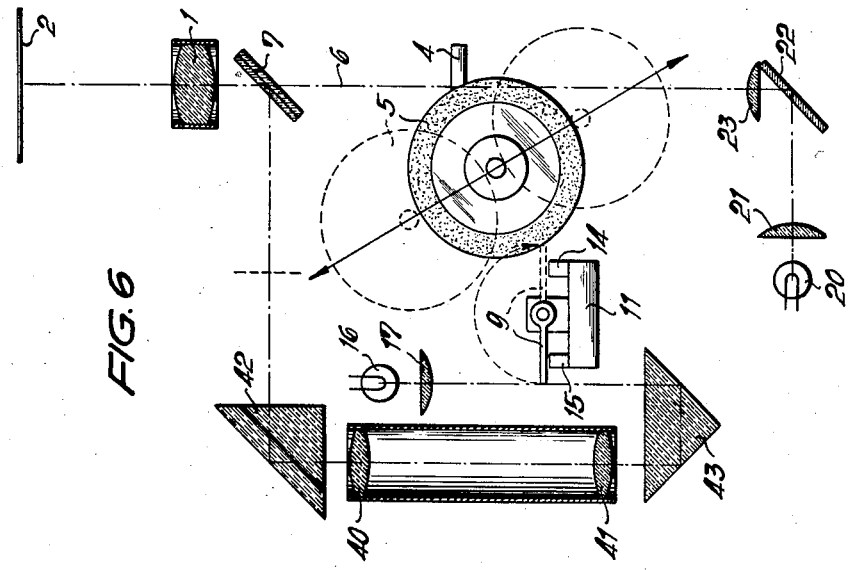
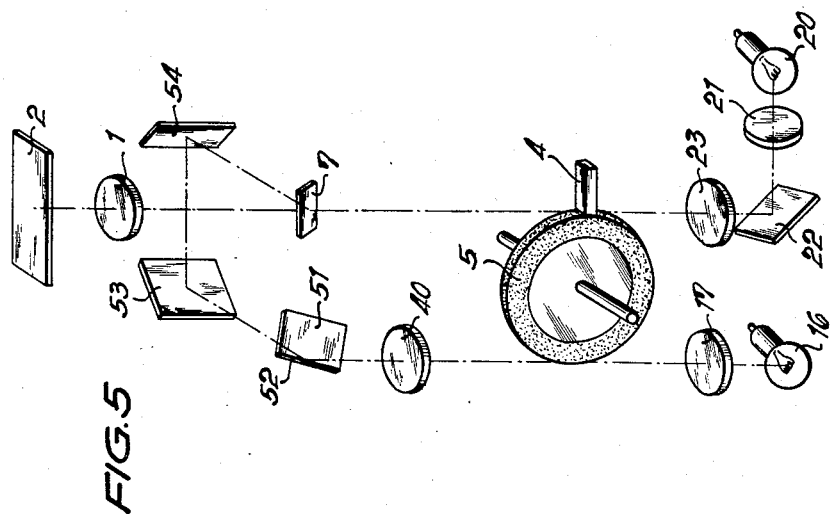

United States Patent Office 2,845,756
Patented Aug. 5, 1958

2,845,756

PROFILE PROJECTOR OR COMPARATOR FOR CUTTING MACHINE TOOLS

Friedrich Papke, Braunschweig, Germany, assignor to Voigtländer Aktiengesellschaft, Braunschweig, Germany, a corporation of Germany Application February 25, 1957, Serial No. 641,947

Claims priority, application Germany February 24, 1956

10 Claims. (Cl. 51—165)

This invention relates to optical devices for projection and reflecting, to be used in combination with cutting machine tools.

Cutting machine tools provided with a projection device have been known previously. The object of such devices is to observe the progress in the machining of a work piece, whereby usually the contour of the enlarged profile is compared with a drawing enlarged on a corresponding scale, on the viewing screen. Such machine tools provided with projection devices are frequently constructed in such a manner that diascopic as well as episcopic projection can be used. In many cases the tools carry out a movement, e. g. an oscillating movement. In such cases it is not possible to sharply project the work piece as well as the tool simultaneously, because in using diascopic projection a more or less sharp shadow image of the tool oscillates through the image plane, while in the use of episcopic projection e. g. the grinding disc is not reproduced at all.

As in the case of precision grindings it is extremely important to observe also the machining tool in the projection plane, in some cases a so-called "phantom" of the tool is used. Such "phantom" is an exact copy of the contour of the tool and it is reflected over a beam splitter into the path of the projection rays of the projection system. The use of the phantoms renders it possible to permanently bring the location and the contour of the grinding disc sharply to the projection surface, independently of whether diascopic or episcopic projection is used, because the phantom does not take part in the oscillating or the like movement of the grinding disc and follows only the feed movement of the tool in the coordinates perpendicularly to the axis of image formation.

However (the conformity between the contour of the tool and the phantom is always only temporary, because the tool (e. g. the grinding disc) is subject to a continuous abrasion due to the machining of the work piece. This introduces particularly in precision work or in the machining of work pieces which cannot be projected (vertical flanks of rotation profiles) an element of uncertainty into the operation. A permanent control of the tool and its phantom will become necessary and this may be rather troublesome.

The main object of the present invention is an automatic device in which the phantom is constantly corrected in the above mentioned projection devices for cutting machine tools. Other objects and the advantages of the invention will be apparent from the appended claims and drawings and the following specification which illustrate, by way of example, some embodiments and best modes of carrying out the invention, to which the invention is not limited.

In the appended drawings,

Figure 1 is a diagrammatical illustration of an embodiment of the invention;

Figure 2 is the diagram of an illuminating system for diascopic projection, and

Figure 3 shows a similar, but somewhat modified arrangement;

Figure 7:
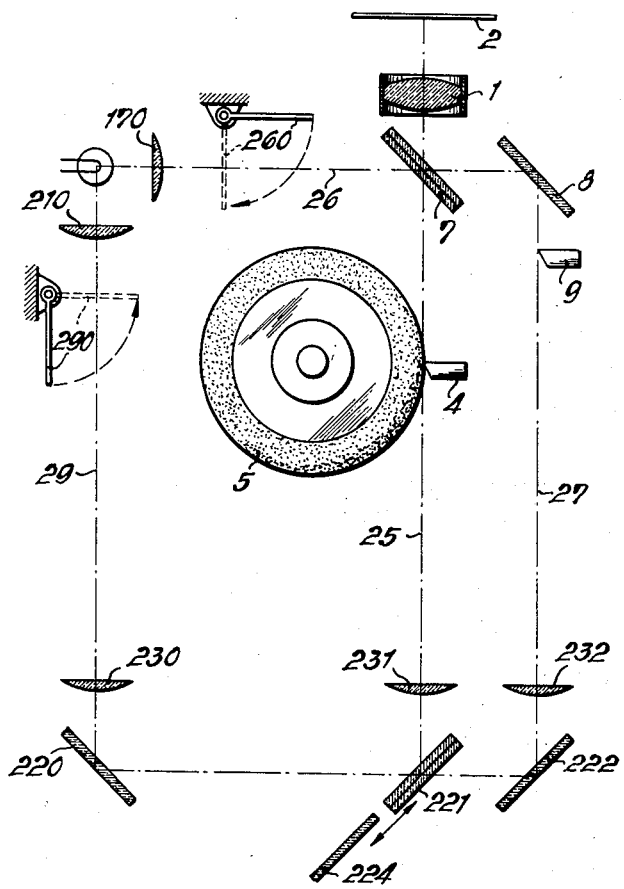
Figure 8:
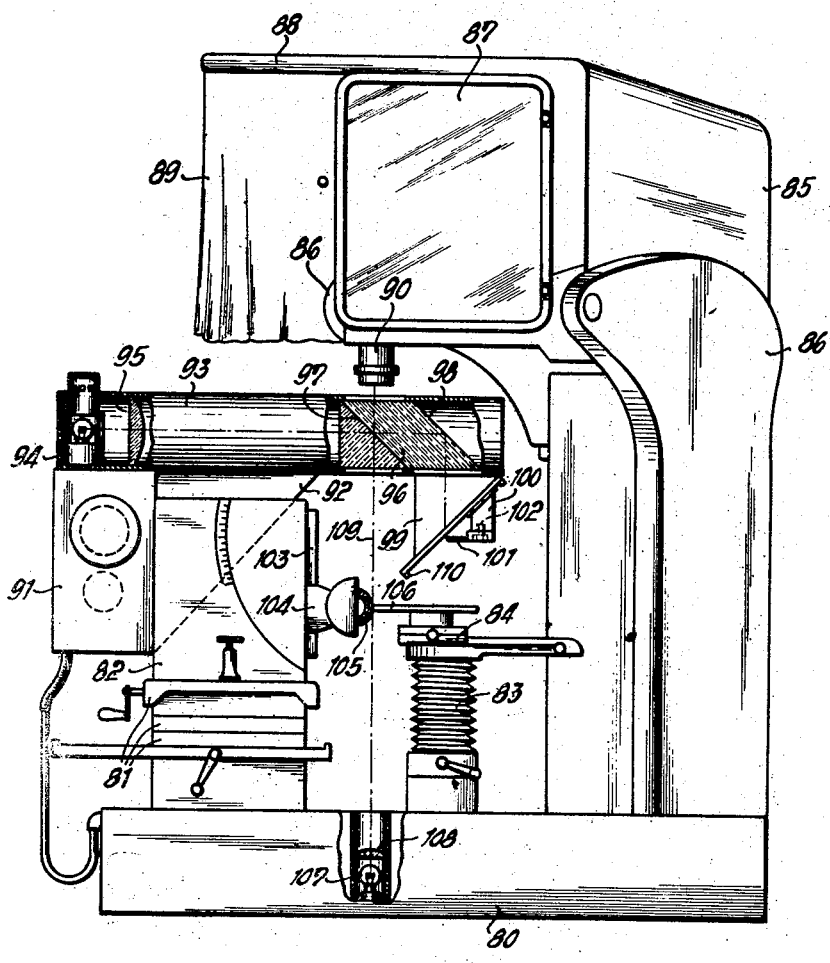

Figure 4 diagramatically illustrates still another modified structure for carrying out the invention;

Figure 5 diagrammatically shows an arrangement for processing rotation profiles, while Figure 6 is a similar illustration of a modified arrangement;

Figure 7 is the diagrammatic illustration of a modified embodiment of the illuminating system; and Figure 8 illustrates the arrangement of an optical device according to the invention in a grinding machine.

Referring now to the drawings in detail, in Fig. 1 reference symbol 1 denotes the objective which produces the image 3 of work piece 4 on screen 2. Grinding disc 5 carries out an oscillating movement in the direction of optical axis 6. Over partially permeable mirror 7 and mirror 8, the phantom 9 is reflected into the path of rays; it is seated on a slide 10 of the phantom-holder 11, which is fastened to the grinding head 12 in such a manner that it takes part in the feed movement of grinding disc 5. In addition to the feed movement, the grinding disc carries out the beforementioned constant oscillating movement. The reflecting device is likewise connected with grinding head 12 and likewise takes part in the feed movement of grinding disc 5. The phantom 9 lies in the reflected focal plane of the objective 1. The phantom consists, in the example shown, of a small, very thin plate of steel which may be enclosed by a frame 13 in order to increase its stability. It represents the counter contour of the grinding disc 5, said contour being obtained by incision grinding in a manner known by itself. The slide 10 of phantom holder 11, which—as usual—is arranged here in inclined position to the plane of the feed movements of grinding disc 5, renders it possible to move the phantom 9 toward the grinding disc 5.

The holding slide 10 of the phantom has two stationary stops 14 and 15, between which the phantom 9 can be displaced in alternate directions. The displacement path between these two stops 14 and 15 corresponds, in its perpendicular projection relative to the optical axis 6, to the distance of the optical axis 6 of the projection system from the reflected axis obtained by parallel reflection. If the phantom 9 is advanced to the lower stop 14, the grinding disc 5 grinds by incision its contour into the material of phantom 9. Thereby, phantom 9 is located in the focal plane of the image-forming objective 1. In the second position, i. e. when the phantom is moved to stop 15, its image will be located again in the focal plane and reflected in such a manner that its contour coincides with the location of the image in the preceding position. If the grinding disc 5 has been subject, due to its use, to a gradual abrasion, it will become necessary to advance the phantom 9 in the direction of the abrasion by a small distance and to move it on slide 10 in the direction toward the lower stop 14. In this manner the position of phantom 9 as well as its contour is corrected. When returned to the position 15, this contour will yield again the reflected image.

Illumination of the phantom is effected preferably by means of a diascopic device which—in the example shown in the drawing—comprises the lamp 16 and the condenser 17. However, the diascopic light which is derived from lamp 18 and condenser 19, and used for the illumination of work piece 4, can also be utilized. In this case, the illuminating beam is obtained over geometrical or physical beam splitting means (see Fig. 2). If, however, episcopic projection is used for the phantom (see the arrangement shown in dotted line in Fig. 1 including lamp 160 and condenser 170), the profile of the grinding disc 5 is obtained as a dark surface on bright ground.

The reflected phantom can be distinguished by a different coloration from the light rays of the image-forming beam. In this case it is possible to carry out the above mentioned physical beam splitting of the illuminating rays by means of a partially permeable mirror 24 (see Fig. 2) by means of an interference filter which yields different colors in transmitted light and reflected light, without substantial losses. The contour of the work piece can be more clearly distinguished from the contour of the phantom in this manner.

Fig. 2 diagrammatically illustrates the illuminating device (which has already been mentioned above) for the reflection of the phantom and work piece in the case of diascopic projection by means of a beam splitter.

The term "diascopic" is used herein to denote the procedure in which a light beam is incident from the rear on the object to be illuminated and presents only the contour of the object to the projection device. In contrast to this the term "episcopic" is used to denote the procedure in which the surface of the object to be projected is illuminated, whereby the illuminated field is reflected back as a whole into the projection device.

The reference symbol 20 denotes a light source which transmits light over condenser 21 to mirror 22, which conveys it, over a further condenser 23, to beam splitter 24. One beam 25 passes over work piece 4, which is machined by the grinding disc 5, through the partially permeable mirror 7, to the projection objective 1 and finally to screen 2. The other beam 27 passes from beam splitter 24 over mirror 28 to phantom 9 which is adjustably guided on slide 10 of phantom holder 11, for example in the same manner as shown in Fig. 1. Mirrors 24 and 28 are mechanically connected with phantom 9 and are displaced together with the phantom. From here beam 27 passes to mirror 8 and is conveyed by said mirror 8 to the partially permeable mirror 7 so that the image of phantom 9 is likewise formed on screen 2 over projection objective 1. Reflection of the phantom is preferably carried out by a system which forms images in the proportion 1:1. The objective which brings about reflection of the phantom can be formed of two symmetrical individual objectives 41 and 40, the distance of which relative to each other can be adjusted in such a manner that a compensation for different lengths of path between the position of phantom 9 and the reflected focal plane is obtained. In order to save space, two or more mirrors can be arranged in the path of rays of the reflection, which permit lateral displacement of the path of rays which extends perpendicularly to optical axis 6. Furthermore, the light source 20 and the condenser system 21, together with phantom 9, can be fixedly connected with the feed movement of the tool. The work piece and the phantom can be illuminated with light of different colors.

In the case of using the diascopic procedure for the illumination of phantom 9 (see Fig. 2) during relief grinding of the work piece 4, it is necessary for the projection to use a transparent phantom. Thereby its lower surface should be provided with a non-transparent coating.

Fig. 3 diagrammatically illustrates a similar arrangement with combined light, whereby episcopic procedure is used for the illumination of the work piece and diascopic procedure for the phantom. In this case the beam splitter denoted 24 in Fig. 2 is replaced by a full mirror 240. Similar parts occurring also in Figs. 1 and 2, are denoted with similar reference symbols. Further description of details of this arrangement appears therefore unnecessary.

Fig. 4 illustrates a further modification of the present invention. In this case too, parts similar to those used in Figs. 1 to 3, are denoted by the same reference symbols. In this arrangement, phantom 9 is located opposite to the point of engagement of grinding disc 5. Its image is conveyed over an optical image-forming system consisting of the symmetrical objective halves 40 and 41 and a roof prism (penta prism) 42, to the beam splitter 7. The objective 40, 41 forms the image of phantom 9 in the reflected focal plane of projection objective 1, whereby prism 42 provides for lateral correctness. The phantom 9 consists also in this case of a narrow, thin strip, in which the contour of the grinding disc 5 is reproduced by incision grinding. It is seated on slide 10 which is displaceable in certain intervals perpendicularly to the optical axis 6, between stops 14 and 15 and is moved in each case toward the grinding disc if the abrasion of the grinding disc 5 is supposed to be taken into consideration. Thereby the new contour of the grinding disc 5 is transmitted to the phantom 9. If the position of the phantom at the point of engagement of the grinding disc, and thus also with the contour of the same, is once adjusted in the focal plane, this adjustment is preserved during the further course of operation of the machine tool, due to the optical image formation, until the phantom—after a certain period of time to be determined by experience—is again adjusted to the grinding disc, the size of which has been reduced by abrasion. The optical system for reflecting this phantom is firmly connected also in this case with the grinding head of the grinding disc (which is not shown in detail in Fig. 4), and it takes part—as described above in connection with Fig. 1—in the feed movements of the grinding disc in a plane which is perpendicular to the optical axis 6.

In the treatment of rotation profiles, i. e. particularly in cases in which the grinding disc does not perform an oscillating movement, the grinding disc 5 can be projected also directly. In such a case the use of a phantom may become unnecessary.

Such an arrangement is diagrammatically illustrated in Fig. 5. The opposite side of the grinding edge of grinding disc 5 replaces in this case the phantom. In such an arrangement the prism can be replaced by two mirrors 51 and 52, which form a right angle with one another. In front of the beam splitter 7 two additional mirrors 53 and 54 are located. The part of the reflected image-forming beam, which extends perpendicularly to the optical axis, has thereby a parallel displacement.

Another embodiment is diagrammatically illustrated in Fig. 6. In this embodiment the course of the beam is reversed, so that the phantom image is formed over prism 43. This arrangement has particular advantages in grinding processes with an inclined movement relative to the optical axis, of the oscillating grinding disc 5. In this embodiment, the phantom is moved to the grinding disc by a swinging movement of 180° in order to correct its profile. This movement is limited by stops 14 and 15.

In the embodiments described above, there is a fixed connection of the reflected system with grinding head 12. This arrangement has the great advantage that swinging movements of the grinding disc about the optical axis also do not cause a change in the position of the phantom image relative to the point of engagement of the grinding disc. According to this modification of the invention it is possible to grind cone-shaped profiles, whereby the kind of the cone, i. e. the contour of its base surface may be of a complicated design. For example, drawing nozzles can be prepared in this manner.

In a structurally simpler form of the invention a beam splitter and a mirror are used and both are rotatably arranged only about the axis of the image-forming objective. The swinging movement of the system for reflecting the phantom is thereby coupled with the swinging of the grinding support about a vertical axis by means of a link quadrilateral control or the like. In this manner it becomes possible that in addition to feed movements of the grinding disc in the vertical coordinates tilting movements of the same about the optical axis can be also positively coupled.

A specific embodiment of the illuminating arrangement is diagrammatically illustrated in Fig. 7.

By means of a single light source the phantom as well as the work piece can be illuminated by the diascopic, episcopic, or combined procedure. The light path 26 provides for the normal episcopic illumination for the work piece and the phantom, whereby the light ray passes through condenser system 170, over beam splitter 7 to the work piece 4, as well as the phantom 9.

The light ray is conveyed by the condenser system 210/230 first to the mirror 220, where it is deflected by 90° and is subsequently incident on the partially permeable mirror 221, by which it is, on the one hand, again deflected by 90° for diascopic illumination of the work piece 4 and, on the other hand, is permitted to pass and is conveyed further over mirror 222 for the simultaneous diascopic illumination of the phantom 9.

Instead of the partially permeable mirror 221, a fully reflecting mirror 224 can also be used. In this case diascopic illumination will take place for the work piece 4 only.

By removing mirrors 221 and 224 from the path of rays only the phantom will be illuminated by diascopic illumination. In the path of rays 26 and in the path of rays 29, each, a locking cap 260 and 290, respectively, is arranged. By actuation of this locking cap and depending on whether the mirror 221 or the mirror 224 is brought into the path of rays, the following combinations of illumination are possible:

(1) Work piece and phantom are both treated by diascopic illumination: cap 290 is closed and cap 260 is open.

(2) Work piece and phantom are both treated by combined light: both caps are open and the partially permeable mirror 221 is in the path of rays 29.

(3) Work piece and phantom are treated by diascopic illumination: the position is as in the preceding case, but cap 260 is closed.

(4) The phantom is in periscopic illumination and the work piece is in combined light: both caps are open and the fully reflecting mirror 224 is in the path of rays 29.

(5) The phantom is in combined light and the work piece is in episcopic illumination: both caps are open and mirrors 221 and 224 are not in the path of rays.

It will be understood from the above that the invention permits continuous correction of the phantom in dependence on the swinging position of the grinding disc and on its abrasion. For full clarification I wish to summarize as follows:

The grinding disc 5 moves on a straight slide, or on a cross slide. The object of the latter is to move the grinding disc in a plane which is perpendicular to the optical axis. The shape of the grinding disc in the focal plane, represents the desired shape of the phantom; it is equivalent with the surface of the grinding disc, which engages the work piece 4.

In addition to the movement of the grinding disc perpendicularly to the optical axis, the disc also has an axis of rotation which has a parallel orientation to the optical axis. These degrees of freedom, i. e. the rotation about its own axis for the grinding proper and the oscillating movement, i. e. a stroke for the depth of the grind, are needed by the disc in order to move along, or grind, a contour. Additionally, this axis can be also tilted in dependence on the requirement to be met and the design of the profile to be ground. Thereby the disc is adjusted to an inclined position, which is necessary for obtaining relief grindings.

The phantom takes part only in the oscillating movement of the tool. It always remains in the focal plane and thus permits an uninterrupted projection to the screen 2. According to the invention the phantom is displaced only in order to bring about a correction of its contour in conformity with the wear of the tool edge which is in engagement with work piece 4.

Fig. 8 illustrates the arrangement of an optical device according to the present invention within a grinding machine.

The grinding machine comprises a base socket 80, which carries a grinding support 82, which is adjustable over intermediate members 81, and the work piece support 83 with its cross table 84. Furthermore, the casing 85 for the projection device is suspended on carriers or girders 86 on socket 80. The casing 85 carries the projection screen 87 which is overlapped by a canopy 88 and can be screened off from outer light by curtain 89. From the casing 85 the tubular member 90 carrying the objective, projects. The grinding support 82 carries also the casing 91 for the motor and machinery. To this casing 91, supported by plate 92, a tube 93 is fastened, in which the illuminating arrangement for episcopic illumination of the work piece and the phantom are located. This arrangement comprises the lamp casing 94, the condenser 95 and the prism arrangement 96, which contains the beam splitter 97 and the deflecting mirror 98. Fixedly connected with tube 93 is a carrier or bracket 99, in which the phantom holder 100 is guided as a slide. On the phantom holder 100 the phantom 101 is longitudinally displaceably held by means of a knurled-head screw 102. The grinding slide 104 with the grinding disc 105 is tiltably arranged on a carrier 103, or the like, on the grinding support 82. Reference symbol 106 denotes a work piece which is in engagement with grinding disc 105. In the socket 80 of the machine a lamp 107 with a condenser 108 is also arranged for the diascopic illumination of work piece 106.

In setting up the grinding machine, the tube 93, which is fixedly connected with the grinding support, and thus also the phantom 101, which is fixedly arranged on this tube, are always moved in the same manner as the grinding disc 105 in its feed movement. While the grinding disc 105 carries out in its operation a constantly oscillating movement in the direction of the optical axis 109, the phantom 101 rests in the focal plane which is reflected in the path of rays of the objective, over mirror 98 and beam splitter 97. The episcopic illumination is imparted to work piece 106 and the phantom 101 from the light source 94 over beam splitter 97 and mirror 98. The image thus formed is projected to the viewing screen 87. If it is desired to correct the counter contour of the grinding disc 105, which is present in phantom 101, in accordance with the abrasion of the grinding disc, phantom holder 100—after the phantom has been somewhat displaced by loosening the knurled-head screw 102—is brought, in girder 99, up to the lower stop 110, whereby the phantom meets in the plane of the work piece surface the grinding disc 105 and obtains the corrected contour from the latter by the incision process. Subsequently, the phantom holder 100 is brought again to its upper stop position so that the phantom will be located in the plane of sharp vision necessary for the reflection into the viewing path of rays.

The optical conditions in the arrangement according to Fig. 8 substantially correspond to the conditions already explained above in connection with Fig. 1. Merely the illuminating device denoted in Fig. 1 by reference symbols 16 and 17, for the diascopic illumination of the phantom, is omitted in Fig. 8 for the sake of clearness. In practice, an episcopic illumination, which is present in Fig. 8, will be sufficient for the phantom. If, for particular purposes, diascopic illumination should become necessary, a corresponding arrangement below phantom 101 can be provided for. This arrangement would have to be likewise fixedly connected with tube 93 and carrier 99, so that it takes part in the feed movement of the grinding disc in the same manner as the phantom. Therefore, there is no difficulty in selecting the dimensions in such a manner that the phantom 101 with its holder 100 can be unobstructedly conducted above the light source arranged for the diascopic light and above the deflecting mirror coordinated with this light source, when the phantom is supposed to be moved in the direction of grinding disc 105 for correction.

It will be understood from the above, that this invention is not limited to the constructions, arrangements, designs, steps and other details specifically described above and illustrated in the drawings and can be carried out with various modifications. For example, the surface of the phantom, which may consist of a transparent or non-transparent material, may be provided with a reflecting layer. Furthermore, the movements necessary for the correction of the phantom may be positively coupled with oscillating movements of the tool at predetermined times, e. g. by an eccentric, or a locking mechanism. These and other modifications can be made without departing from the scope of the invention as defined in the appended claims.

The term "focal plane" is used herein to denote the focal plane, which by means of the complete optical system of the projection assembly, enables the sharp reproduction of the work piece on the viewing screen of the projection assembly. This projection assembly consists of the beam splitter 97, the deflecting mirror 98, projection lens (90) and, if necessary, other optical elements. The original focal plane which is located on the optical axis 109 below said lens is divided by the beam splitter 97 which reproduces the work piece 106 on the viewing screen 87 in such a way that a second focal plane, equally in its optical effectiveness, originates at the place of the phantom 101. The beam splitter 97 also takes the function for corradiation, since it enables the subject from the second focal plane thus achieved, to be reproduced at the same times on the viewing screen and to superimpose its image with the image received from the focal plane in which the work piece 106 is situated.

What is claimed is:

1. An optical profile projector or comparator device for cutting machine tools, comprising a tool, a viewing screen, a system for projecting a work piece to the viewing screen; a phantom member having a contour corresponding to that of the cutting tool of the cutting machine, and means for reflecting an image of the phantom member into the viewing path of rays of the projecting system, and thus projecting it to the viewing screen; a holder for said phantom member; said phantom member being changeable and being movably arranged in such a manner that its image can be adjusted to a required shape, in conformity with the wear of the tool, whereby the phantom member is displaceably arranged in its holder and can be moved in its holder to the tool, in order to have the phantom member corrected in conformity with changes of the tool.

2. An optical device as claimed in claim 1, in which the phantom consists of a thin metal strip provided with a stiffening frame.

3. An optical device as claimed in claim 1, comprising means for including, instead of the phantom, a part of the tool of the cutting machine in the illuminating path of rays, said part being not in engagement with the work piece.

4. An optical device as claimed in claim 1, in which the holder for the phantom consists of a guide slide which is provided with an upper stop member and a lower stop member for limiting displacement of the phantom in the holder.

5. An optical device as claimed in claim 1, in which the holder for the phantom consists of a guide slide which is provided with an upper stop member only; the device comprising an illuminating system for projecting only the phantom's lower side which is turned away from the direction of rays of the objective for projecting the work piece, the phantom being thereby put on the work piece.

6. An optical device as claimed in claim 1, in which the work piece and the phantom are illuminated with light or different colors.

7. An optical device as claimed in claim 1, in which light derived from a light source for illuminating the work piece and phantom, is split by an interference beam splitter.

8. An optical device as claimed in claim 1, in which the holder for the phantom consists of a guide slide which is provided with two spaced stops for limiting displacement of the phantom in the holder, said slide being inclined in an angle of 0° to 90° relative to the optical axis of the image-forming system.

9. An optical device as claimed in claim 8, in which the stops are spaced at a distance permitting movement of the phantom by an amount which corresponds to the distance between the optical axis for reflecting the phantom and the optical axis of the image-forming system.

10. An optical device as claimed in claim 1, in which the phantom is rotatably carried by the phantom holder, in order to permit shifting of the phantom from the plane of engagement into the reflection plane.

References Cited in the file of this patent

UNITED STATES PATENTS

| 2,404,770 | Bennett | July 30, 1946 |

FOREIGN PATENTS

| Serial No. V5489Ib/67a | Germany | Nov. 3, 1955 |